US005659178A

United States Patent [19]

Bucher et al.

[11] Patent Number: 5,659,178

[45] Date of Patent: Aug. 19, 1997

[54] METHOD AND APPARATUS FOR THE ALIGNMENT OF PRINTING FUNCTIONS BY OPTICAL BEAMS REFLECTED FROM SHEETS

[75] Inventors: Harald Bucher, Eschelbronn; Anton Rodi, Leimen, both of Germany

[73] Assignee: Heidelberger Druckmaschinen Aktiengesellschaft, Heidelberg, Germany

[21] Appl. No.: 632,627

[22] Filed: Apr. 15, 1996

[30] Foreign Application Priority Data

Apr. 15, 1995 [DE] Germany ........................ 195 14 252.7

[51] Int. Cl.[6] ........................ G01N 21/86

[52] U.S. Cl. ........................ 250/559.3; 250/548

[58] Field of Search ........................ 250/559.3, 548, 250/559.4; 414/676, 627, 625, 940, 937; 101/177, 485, 486, DIG. 30, DIG. 36; 356/400, 401

[56] References Cited

U.S. PATENT DOCUMENTS

| | | | |
|---|---|---|---|
| 4,203,361 | 5/1980 | Pollich | 101/177 |
| 5,313,886 | 5/1994 | Muller | 250/559.4 |
| 5,380,366 | 1/1995 | Becker et al. | 250/559.4 |

FOREIGN PATENT DOCUMENTS

| | | |
|---|---|---|
| 2724856 | 12/1978 | Germany . |
| 1237157 | 4/1991 | Japan . |
| 1568751 | 6/1980 | United Kingdom . |

*Primary Examiner*—Que Le

*Attorney, Agent, or Firm*—Nils H. Ljungman and Associates

[57] ABSTRACT

The invention relates to a sheet-fed rotary printing machine comprising sheet-transfer drums disposed between the printing units. Sheet-guiding plates are assigned to the sheet-transfer drums, and the sheet-guiding plates extend over the length of a respective sheet-transfer drum. The sheet-guiding plates are disposed so that measurements may be taken on the printed sheet being moved.

20 Claims, 3 Drawing Sheets

METHOD AND APPARATUS FOR THE ALIGNMENT OF PRINTING FUNCTIONS BY OPTICAL BEAMS REFLECTED FROM SHEETS

BACKGROUND OF THE INVENTION

1. Field of the Invention

The present invention generally relates to a sheet-fed rotary printing machine comprising sheet-transfer drums disposed between the printing units, sheet-guiding plates being assigned to the sheet-transfer drums and extending over the length of a respective sheet-transfer drum.

2. Background Information

An embodiment such as that described hereinabove is known from German Patent No. 27 24 856 A1, which corresponds to U.S. Pat. No. 4,203,361. In the German document cited herein, the sheet-guiding plates shown are used to guide a respective sheet such that the freshly printed sheet is prevented from being smeared. With the known embodiment, an air cushion is produced by means of an appropriate design of the sheet-guiding plates. The air cushion essentially prevents the printed sheet side from coming into contact with the sheet-guiding plate and, in turn, essentially preventing the printed image from being damaged.

OBJECT OF THE INVENTION

Proceeding from this state of the art, as described hereinabove, it is the object of the present invention to improve the transport of relatively stiff sheet material by means of a sheet-transfer drum so that it can be possible to take measurements on the printed sheet being moved.

SUMMARY OF THE INVENTION

According to the present invention this object can be achieved by assigning a blowing box to the sheet-guiding plate, and, seen in the direction of rotation of the sheet-transfer drum, the sheet-guiding plate with the blowing box can approach the outer cylindrical surface of the sheet-transfer drum up to a small distance with respect to the outer cylindrical surface of the sheet-transfer drum. Additionally, according to the present invention this object can be achieved in that, in the area of the smallest distance to the outer cylindrical surface of the sheet-transfer drum, the blowing box features outlets for the blowing air, end that a measuring system is provided in the area of the blowing box featuring the smallest distance to the outer cylindrical surface of the sheet transfer drum. Even when processing relatively stiff sheet material this solution can essentially ensure that the air cushion also causes the sheet end to be reliably pressed onto the outer cylindrical surface of the sheet-transfer drum so that exact measurements may be taken by register marks, for example. Today's usual highly precise measuring systems essentially only work precisely if the sheet material can reliably rest on the outer cylindrical surface. This solution facilitates in a simple manner the taking of measurements even up to the end of the stiff sheet material.

In an advantageous embodiment of the present invention the sheet-guiding plate with the blowing box can be fastened to the machine side frames so that the sheet-guiding plate with the blowing box can be adjustable relative to the outer cylindrical surface of the sheet-transfer drum, and the measuring system is located downstream from the blowing box. Thus, it can be possible to set the smallest distance to the sheet material to an accuracy of a tenth of a millimeter, so that a measurement taken immediately thereafter is essentially not subjected to any inaccuracies or fluctuations.

A further advantageous embodiment of the present invention is characterized in that the sheet-guiding plate with the blowing box can extend close to the outer cylindrical surface of the preceding sheet-delivering sheet-transfer drum. In particular, the stiff sheet end may tend to stick up tangentially from the outer cylindrical surface so that the freshly printed sheet may strike on a guiding device and, as a result thereof, may be damaged, if it is not ensured that the freshly printed sheet is directly guided and transferred from the preceding sheet-transfer drum onto the sheet-guiding plate. Thus, the solution of the present invention not only can essentially permit an exact and smear-free guide of relatively stiff sheet material, but it can also essentially guarantee that the measurements taken produce exact results i.e. that the respective position of a sheet to be measured is essentially always the same.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a method of determining sheet alignment in an apparatus, the apparatus comprising means for holding a sheet with a design thereon during transfer of a sheet with a design thereon from one structure to another structure in the apparatus, the method comprising the steps of: aligning a sheet with a design thereon at least partially onto a guiding surface with compressed air being blown through at least one orifice; guiding a sheet with a design thereon with a plate for guiding a sheet; directing a beam onto the sheet with the design thereon; reflecting the beam off the sheet with the design thereon; directing the reflected beam from the sheet with the design thereon onto detecting means, the detecting means comprising a position sensitive receiver for detecting the reflected beam; generating a signal with the reflected beam received by the detecting means, which signal corresponds to a position of the design on the sheet; and disposing the detecting means at a location substantially adjacent one of the at least one orifice, the detecting means being disposed to detect the position of the design on the sheet from which the reflected beam is reflected.

Another aspect of the present invention resides broadly in a device for determining sheet alignment in an apparatus for feeding sheets, the device comprising: means for holding a sheet with a design thereon during transfer of a sheet with a design thereon from one structure to another structure in the apparatus; a plate for guiding a sheet with a design thereon; a beam source for directing a beam onto a sheet with a design thereon; detecting means for detecting a beam reflected from a sheet with a design thereon, the detecting means comprising a position sensitive receiver for detecting a reflected beam; at least one orifice; a guiding surface; chamber means for supplying compressed air to be blown through the at least one orifice to align a sheet with a design thereon at least partially onto the guiding surface; the detecting means being disposed to detect a position of the design on a sheet from which sheet the reflected beam is reflected, upon the sheet being substantially adjacent the at least one orifice; and a signal generator for generating a signal from the reflected beam received by the detecting means, the generated signal corresponding to the position of the design on a sheet.

An additional aspect of the present invention resides broadly in a method of operating a device for determining sheet alignment in an apparatus for feeding sheets, the apparatus comprising means for holding a sheet with a design thereon during transfer of a sheet with a design thereon from one structure to another structure in the apparatus, the device comprising: a plate for guiding a sheet with a design thereon, a beam source for directing a beam onto a sheet with a design thereon, detecting means for detecting a beam reflected from a sheet with a design thereon, the detecting means comprising a position sensitive receiver for detecting a reflected beam, at least one orifice, a guiding surface, chamber means for supplying compressed air to be blown through the at least one orifice to align a sheet with a design thereon at least partially onto the guiding surface, the detecting means being disposed to detect a position of the design on a sheet from which sheet the reflected beam is reflected, upon the sheet being substantially adjacent the at least one orifice; and a signal generator for generating a signal from the reflected beam received by the detecting means, the generated signal corresponding to the position of the design on a sheet; the method comprising the steps of: aligning a sheet with a design thereon at least partially onto a guiding surface with compressed air being blown through at least one orifice; guiding a sheet with a design thereon with a plate for guiding a sheet; directing a beam onto the sheet with the design thereon; reflecting the beam off the sheet with the design thereon; directing the reflected beam from the sheet with the design thereon onto detecting means, the detecting means comprising a position sensitive receiver for detecting the reflected beam; generating a signal with the reflected beam received by the detecting means, which signal corresponds to a position of the design on the sheet; and disposing the detecting means at a location substantially adjacent one of the at least one orifice, the detecting means being disposed to detect the position of the design on the sheet from which the reflected ben is reflected.

BRIEF DESCRIPTION OF THE DRAWING

The present invention is explained in greater detail below with reference to various embodiments which are illustrated in the accompanying drawings, in which.

DESCRIPTION OF THE PREFERRED EMBODIMENT

Figure 1:
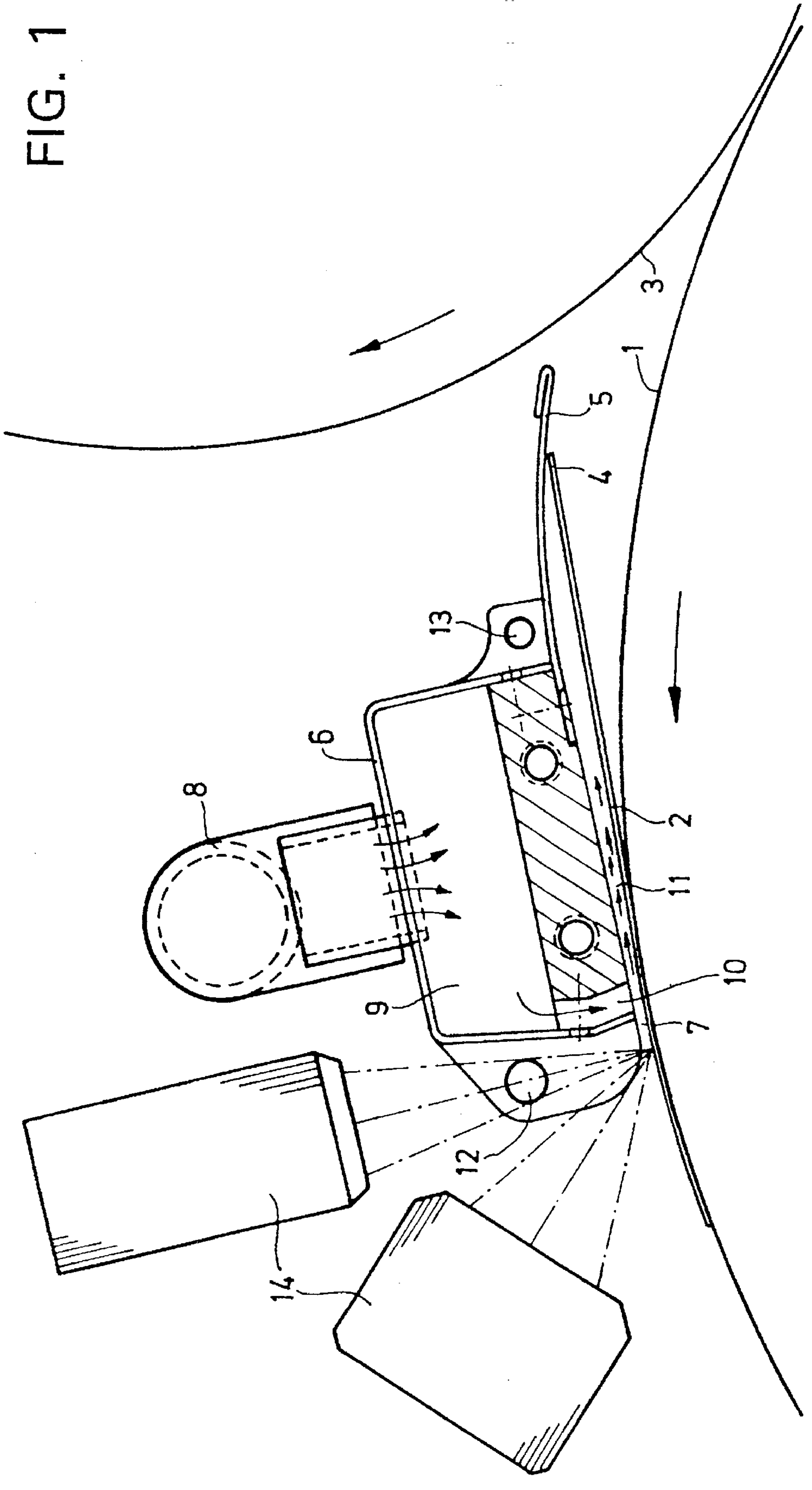
FIG. 1 schematically illustrates an advantageous embodiment of the present invention.

As shown in FIG. 1, the sheet-transfer drum 1 can receive from a preceding sheet-transfer drum 3 and an impression cylinder (not shown), respectively, the freshly printed sheet 2 to be conveyed, the grippers of sheet-transfer drum 3 and impression cylinder, respectively, transmitting the sheet 2 to the grippers of sheet-transfer drum 1. When processing stiff sheet material the sheet end 4 of sheet 2 may tend to stick up tangentially from the outer cylindrical surface of the sheet-transfer drum 1.

Figure 1A:
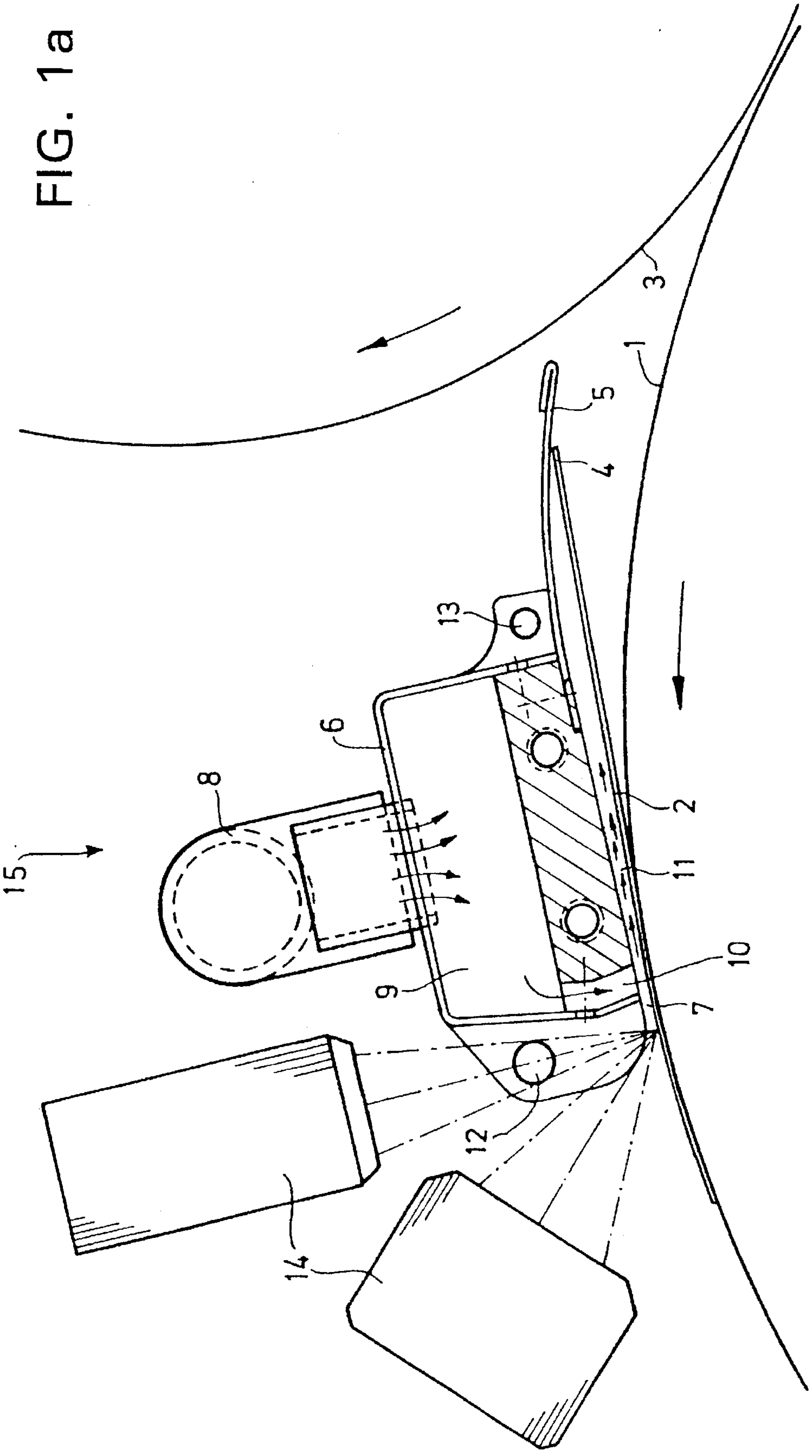
FIG. 1*a* is essentially the same as FIG. 1, but is more detailed.
Figure 2:
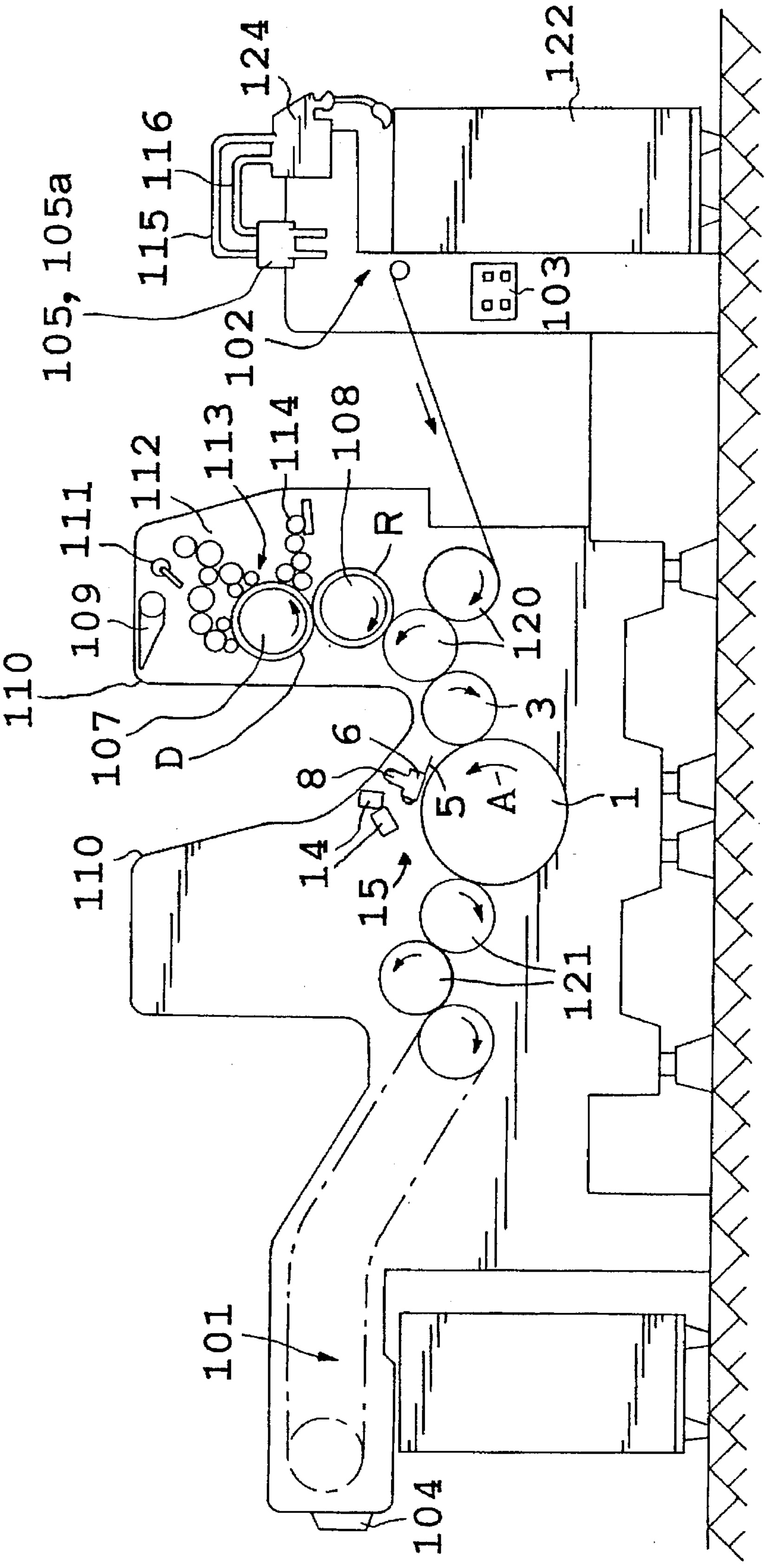
FIG. 2 shows a side view of a printing press incorporating a device for blowing air over a sheet-transfer drum in accordance with the present invention.

A sheet-guiding plate 5 can be provided above the outer cylindrical surface of the sheet-transfer drum 1, the sheet-guiding plate 5 forming, together with a blowing box 6, a unit (shown as working unit 15 in FIGS. 1*a* and 2). Seen in the direction of rotation of the sheet-transfer drum 1, the area of the sheet-guiding plate 5 and of the blowing box 6 facing the sheet-transfer drum 1 approaches the sheet-transfer drum 1 up to a small gap with respect to the outer cylindrical surface of the sheet-transfer drum 1 (at 7). The distance 7 may be smaller than one millimeter and can essentially depend on the thickness of the sheet material to be printed.

That is, the distance between the sheet-transfer drum and the blowing box 6 with the attached sheet-guide plate 5 decreases to a small gap 7.

An air-supplying system 8 can supply the blowing box 6, which blowing box 6 can extend over the length of the sheet-transfer drum 1, with blowing air which blowing air is preferably uniformly distributed in the chamber or space 9. In the area with the smallest distance 7, outlets 10 can be provided on the underside of the blowing box 6 for producing an air cushion 11 between the sheet 2 and both the guiding surface of the sheet-guiding plate 5 and the blowing box 6. As a result thereof, the sheet 2 to be conveyed can be entirely spread on the outer cylindrical surface of the sheet-transfer drum 1. The blowing box 6 is preferably adjustably fastened to the machine side frame by means of fastening screws 12, 13.

It can be advantageous to provide a measuring system 14 in the area of the smallest distance 7, the measuring system 14 permitting measurements to be taken on the printed sheet 2 in view of, for example, register accuracy, colour fluctuations or the like. It is also conceivable to dispose the measuring system 14 immediately downstream of the blowing box 6, so that the measuring system 14 may be adjusted independently and that measurements may be taken directly beside the blowing box 6. In this area, too, it can essentially be guaranteed that the sheet material is reliably spread on, or flattened on, the outer cylindrical surface of the sheet-transfer drum 1. That is, the sheet material is flat against the sheet-transfer drum 1, and the sheet material has no irregularities with respect to the outer cylindrical surface of the drum 1.

A further advantage can be that the sheet-guiding plate 5 with the blowing box 6 can extend close to the outer cylindrical surface of the preceding sheet-transfer drum 3 delivering a respective sheet 2, so that with stiff sheet material the freshly printed sheet end 4 of stiff sheet material does not strike the edge of the sheet-guiding plate 5, thus essentially preventing, in a substantially simple manner, any damage, such as smudging of fresh print, to the printed sheet 2.

The disclosure now turns to an example of a rotary printing press in which the present invention, in accordance with at least one preferred embodiment, may be employed, as shown in FIG. 2. It should be understood that components discussed herebelow with reference to FIG. 2 may, if appropriate, be considered to be interchangeable with similar components discussed hereinabove with respect to FIGS. 1 and 1*a*. For example, the blowing box 6 discussed further above with relation to FIGS. 1 and 1*a* may be interchangeable with the blowing box 6 discussed herebelow with relation to FIG. 2.

FIG. 2 depicts a printing machine, or printing press, having a number of rotary printing stands 110, with a sheet delivery 101 and a sheet feeder 102, which sheet feeder 102 can employ an air control device 105, 105*a*. In addition, one of the rotary print stands 110 can also generally include: an ink supply source 109 for containing a supply of ink, a plate cylinder 107 for having mounted thereon a printing plate D; an inking unit 112 which includes ink applicator rollers 113 for applying ink to the printing press; a vibrator roller 111 for receiving ink from the ink supply 109 and transferring the ink to the inking unit 112, a damping, or wetting unit 114 for transferring a damping agent to the printing plate D; a blanket cylinder 108 carrying a rubber blanket R for receiving an ink impression from the plate cylinder 107; sheet drums 120 for carrying a sheet of printing stock to the rubber blanket cylinder 108 for transfer of the ink from the rubber blanket cylinder 108 to the sheet of printing stock; sheet transfer drums 1, 3, 21 for transporting a printed sheet; and, in accordance with the present invention, a measuring system 14, an air-supplying system 8, and a working unit 15, which unit 15 can include a blowing box 6 and sheet-guiding plate 5. Such a printing press can also have other accessory unite, such as washing units, drive units, etc. which are well known and are not shown in the drawings.

The sheet feeder 102 can preferably have a stack of sheets of printing stock 122 and an air blower and suction device 105, 105*a*, 115, 116 and 124, for lifting and transferring single sheets into the printing press. Such an air device can generally have two valve units 105, 105*a*, with one valve unit corresponding to a suction air passage 115 and the other valve unit corresponding to a blower passage 116. The valves 105 and 105*a* can preferably be controlled from an operator control panel 103. Besides being operable via the operator controls 103 at the sheet feeder 102, the sheet feeder 102 may also be operated from a control console 104 located at the delivery pile 101.

A freshly printed sheet 2 (not shown in FIG. 2) can be moved with the aid of gripping means (not shown in FIG. 2) from sheet-transfer drum 3 onto sheet-transfer drum 1. On sheet-transfer drum 1, the sheet 2 can preferably move in the direction indicated by arrow A. The leading edge of the sheet 2 can be moved under the guide plate 5 and be held away from direct contact with the guide plate 5 by means of blowing air supplied by the air-supplying system 8. The sheet 2, moving between the sheet-transfer drum 1 and the working unit 15, can be detected by the measuring system 14 as the leading edge of the freshly printed sheet 2 is moved in the direction of arrow A.

At this point, the measuring system 14 can be capable of sending various types of information to the control console 104, or to other locations, as necessary. Response to information scanned and sent by the measuring system 14 can be automatic or by manual input. Additionally, interaction with the printing machine, using data from the measuring system 14, can be by remote control from any suitable location. Data to be scanned and measured can include: the moment of emergence of the leading edge of the sheet 2; registration accuracy, which registration can be adjustable; information from print control strips; the numbers of sheets 2 which have been processed; the size of the gap between the sheet 2 and the underside of the working unit 15; and so on.

In accordance with at least one embodiment of the present invention, suitable adjustments can essentially be easily made to any components of the printing machine or essentially to any aspect of the printing process by using data from the measuring system 14.

Print control strips are well known in the art and are discussed in U.S. Pat. Nos. 3,393,618 entitled "Printing Control" and 4,469,025 entitled "Device for Mounting Print Control Strips at a Precise Level and in Registry" and in the documents "GATF Compact Color Test Strip", Zenlon Elyjin, GATF Research Progress, No. 79 (August 1968), "A color Proofing Update", Michael H. Bruno, American Printer (July, 1985) and "Testing, Measuring, Printing—Earning Money", Heidelberg News, Issue 4 (1976)published by Heidelberger Druckmaschinen AG, D-6900 Heidelberg, Federal Republic of Germany, all of theses patents and publications being hereby expressly incorporated by reference as if the contents thereof were set forth in their entirety herein.

Examples of methods of operating and controlling printing machines, methods of controlling inking, and evaluation thereof may be found in the following U.S. Patents: U.S. Pat. No. 4,660,470 which issued to Kramp et al. on Apr. 28, 1987, entitled "Inking Unit Pre-adjustment Method"; U.S. Pat. No. 4,200,932 which issued to Schramm et al. on Apr. 29, 1980, entitled "Means for the Control and Regulation of the Printing Process on Printing Presses"; U.S. Pat. No. 4,505,589, which issued to Ott et al. on Mar. 19, 1985, entitled "Process and Apparatus for the Colorimetric Analysis of Printed Material"; U.S. Pat. No. 4,606,633 which issued to Jeschke and Loffler on Aug. 19, 1986, entitled "Test Method for Evaluating Faults on Printed Sheets and Webs and Apparatus for Performing the Method"; U.S. Pat. No. 4,852,485 which issued to Brunner on Aug. 1, 1989, entitled "Method of Operating an Autotypical Color Offset Printing Machine"; U.S. Pat. No. 5,349,200 which issued to Buck et al. on Sep. 20, 1994, entitled "Method and Apparatus for the Alignment of Paper Stacks in a Printing Press"; and U.S. Pat. No. 4,947,746 which issued to Jeschke and Loffler on Aug. 14, 1990, entitled "Print Control Strip". All of the patents and publications cited in this paragraph being hereby expressly incorporated by reference as if the contents thereof were set forth in their entirety herein.

One feature of the present invention resides broadly in the sheet-fed rotary printing machine comprising sheet-transfer drums disposed between the printing units, sheet-guiding plates being assigned to the sheet-transfer drums and extending over the length of a sheet-transfer drum, characterized in that to a sheet-guiding plate 5 is assigned a blowing box 6, that, seen in direction of rotation of a sheet-transfer drum 1 the sheet-guiding plate 5 with the blowing box 6 approaches the outer cylindrical surface of the sheet-transfer drum 1, the blowing box 6 features outlets 10 for the blowing air, and that a measuring system 14 is provided in the area of the smallest distance 7 of the blowing box 6 to the outer cylindrical surface of the sheet-transfer drum 1.

Another feature of the present invention resides broadly in the sheet-fed rotary printing machine characterized in that the sheet-guiding plate 5 with the blowing box 6 is fastened to the machine side frames so as to be adjustable with respect to the outer cylindrical surface of the sheet-transfer drum 1, and that the measuring system 14 is disposed after the blowing box 6.

Yet another feature of the present invention resides broadly in the sheet-transfer drum characterized in that the sheet-guiding plate 5 with the blowing box 6 extends close to the outer cylindrical surface of the preceding sheet-transfer drum 3 delivering a respective sheet 2.

Examples of printing machines and components thereof may be found in the following documents: U.S. patent application Ser. No. 07/107492 filed on Oct. 8, 1987 entitled "Sheet Transfer Apparatus for Rotary Printing Presses" having inventor Willi Jeschke issued as U.S. Pat. No. 4,830,355 on May 16, 1989 which corresponds to Federal Republic of Germany patent application No. P 36 34 400.1, filed on Oct. 9, 1986 which corresponds to DE-OS 36 34 400.1 and DE-PS 36 34 400.1; U.S. patent application Ser. No. 07/177584 filed on Apr. 4, 1988 entitled "Sheet-fed Rotary Printing Presses for Multi-color Printing" having inventor Hans-Georg Jahn issued as U.S. Pat. No. 4,854,231 on Aug. 8, 1989 which corresponds to Federal Republic of Germany patent application No. P 37 12 703.9, filed an Apr. 14, 1987 which corresponds to DE-OS 37 12 703.9 and DE-PS 37 12 703.9; U.S. patent application Ser. No. 07/475220 filed on Feb. 5, 1990 entitled "Sheet-fed Rotary Printing Press for Multi-color Printing" having inventor Jahn issued as U.S. Pat. No. 5,016,529 on May 21, 1991 which corresponds to Federal Republic of Germany patent application Petty Patent No. G 89 01 222.4, filed an Feb. 3, 1989 which corresponds to DE-OS Petty Patent No. G 89 01 222.4 and DE-PS Petty Patent No. G 89 01 222.4; U.S. patent application Ser. No. 07/574436 filed on Aug. 28, 1990 entitled "Protective Device for Offset Rotary Printing Machines" having inventor Rodi issued as U.S. Pat. No. 5,178,069 on Jan. 12, 1993 which corresponds to Federal Republic of Germany patent application No. P 39 30 364.0, filed on Sep. 12, 1989 which corresponds to DE-OS 39 30 364.0 and DE-PS 39 30 364.0; U.S. patent application Ser. No. 07/621665 filed on Dec. 3, 1990 entitled "Printing Unit Cylinder for a Rotary Printing Machine" having inventors Weber and Gerstenberger issued as U.S. Pat. No. 5,090,319 on Feb. 25, 1992 which corresponds to Federal Republic of Germany patent application No. P 39 39 725.4, filed on Dec. 1, 1989 which corresponds to DE-OS 39 39 725.4 and DE-PS 39 39 725.4, and Federal Republic of Germany patent application No. P 40 34 767.2, filed on Feb. 11, 1990 which corresponds to DE-OS 40 34 767.2 and DE-PS 40 34 767.2; U.S. patent application Ser. No. 07/666398 filed on Mar. 8, 1991 entitled "Print Unit Cylinder for Rotary Presses" having inventors Junghans and Weber issued as U.S. Pat. No. 5,178,068 on Jan. 12, 1993 which corresponds to Federal Republic of Germany patent application No. P 40 07 343.2, filed on Mar. 8, 1990 which corresponds to DE-OS 40 07 343.2 and DE-PS 40 07 343.2, and Federal Republic of Germany patent application No. P 41 02 858.9, filed on Jan. 31, 1991 which corresponds to DE-0S 41 02 858.9 and DE-PS 41 02 858.9; U.S. patent application Ser. No. 07/693861 filed on Apr. 29, 1991 entitled "Sheet Fed Rotary Printing Press" having inventors Rodi et al. issued as U.S. Pat. No. 5,170,706 on Dec. 15, 1992 which corresponds to Federal Republic of Germany patent application No. P 40 13 464.4, filed on Apr. 27, 1990 which corresponds to DE-OS 40 13 464.4 and DE-PS 40 13 464.4; and U.S. patent application Ser. No. 08/288471 filed on Aug. 10, 1994 entitled "Printing Press Having a Device for Controlling the Air in a Sheet Feeder" having inventor Czotscher issued as U.S. Pat. No. 5,476,041 on Dec. 19, 1995 which corresponds to Federal Republic of Germany patent application No. P 43 26 927.3, filed on Aug. 11, 1993 which corresponds to DE-OS 43 26 927.3 and DE-PS 43 26 927.3. These patents and patent applications and their corresponding published patent applications, as well as their published equivalents, end other equivalents or corresponding applications, if any, and the references cited in any of the documents, publications, patents, and published patent applications cited herein, are hereby incorporated by reference as if set forth in their entirety herein. All of the above U.S. patent documents in this paragraph are assigned to Heidelberger Druckmaschinen AG of the Federal Republic of Germany.

Examples of printing presses which may be utilized in accordance with the embodiments of the present invention, may be found in the following U.S. Patents: U.S. Pat. No. 4,203,361 which issued to Pollich on May 20, 1980, entitled "Sheet-fed Rotary Printing Machine" U.S. Pat. No. 5,473,983 which issued to Maul on Dec. 12, 1995, entitled "Rotary Printing Press"; U.S. Pat. No. 5,333,545 which issued to Ganter and Rodi on Aug. 2, 1994, entitled "Sheet-fed Rotary Offset Printing Press with a Removable Imprinting or Finishing Unit"; U.S. Pat. No. 5,372,068 which issued to Lehmann and Schnyder on Dec. 13, 1994, entitled "Rotary Printing Press"; and U.S. Pat. No. 4,934,265 which issued to Knauer on Jun. 19, 1990, entitled "Rotary Offset Printing Machine Plate and Blanket Cylinder Arrangement".

Examples of control devices, control systems, and components thereof, which may be utilized in accordance with the embodiments of the present invention, may be found in the following U.S. Patents: U.S. Pat. No. 5,037,080 which issued to Wirz on Aug. 6, 1991, entitled "Device for Scanning the Length of a Sheet in a Sheet Processing Machine, Especially a Sheet-fed Rotary Printing Press"; U.S. Pat. No. 4,807,528 which issued to Schmoeger and Neece on Feb. 28, 1989, entitled "Offset Prevention Means for Printing Presses"; U.S. Pat. No. 5,142,980 which issued to Bottger and Buschmann on Apr. 17, 1991, entitled "Pneumatic Controller for a Printing Machine"; U.S. Pat. No. 5,365,841 which issued to Uhrig on Nov. 22, 1994, entitled "Safety Device for Control or Regulation Systems of Drive Units of a Printing Machine"; and U.S. Pat. No. 4,432,539 which issued to Fischer on Feb. 21, 1984, entitled "Sheet Feeding System for Printing Machines".

Examples of computer components, microprocessors, data storage and transmission, and components associated therewith, which may be utilized in conjunction with the present invention can possibly be found in the following U.S. Patents: U.S. Pat. No. 3,393,618 which issued to Baker; U.S. Pat. No. 4,200,932 which issued to Schramm et al.; U.S. Pat. No. 4,469,025 which issued to Loffler et al.; U.S. Pat. No. 4,505,589 which issued to Ott et al.; U.S. Pat. No. 4,606,633 which issued to Jeschke et al.; and U.S. Pat. No. 4,852,485 which issued to Brunner.

Some examples of distance measuring systems using optical components can be found in the following U.S. Patents: U.S. Pat. No. 4,336,997, entitled "Change of Distance Measuring Apparatus"; U.S. Pat. No. 4,764,015 to Bieringer and Ringlien, entitled "Method and Apparatus for Non-Contact Spatial Measurement"; U.S. Pat. No. 4,701,049 to Beckman and Oomea, entitled "Measuring System Employing a Measuring Method Based on the Triangulation Principle for the Non-Contact Measurement of a Distance from the Surface of a Contoured Object to a Reference Level"; U.S. Pat. No. 4,611,911 to Kadomatsu, entitled "Electro-Optical Distance Measuring Device"; U.S. Pat. No. 4,373,816 to Laib, entitled "Scanning Beam Optical Position Determining Apparatus and Method"; U.S. Pat. No. 5,054,912 to Kuchel, entitled "Optical Distance-Measuring Device"; U.S. Pat. No. 4,560,270 to Wiklund and Hertzman, entitled "Device Included in a Distance Meter System"; and U.S. Pat. No. 4,397,548 to McCormack, entitled "Distance Measuring System".

Examples of pattern recognition systems, and components associated therewith, which may be utilized in accordance with the embodiments of the present invention, may be found in the following U.S. Patents: U.S. Pat. No. 5,263,107 which issued to Ueda and Togawa on Nov. 16, 1993, entitled "Receptive Field Neural Network with Shift-invariant Pattern Recognition"; U.S. Pat. No. 5,371,347 which issued to Plesko on Dec. 6, 1994, entitled "Electro-optical Scanning System with Gyrating Scan Head"; U.S. Pat. No. 5,267,328 which issued to Gouge on Nov. 30, 1993, entitled "Method for Selecting Distinctive Pattern Information from a Pixel Generated Image"; U.S. Pat. No. 5,239,593 which issued to Wittner and Loris on Aug. 24, 1993, entitled "Optical Pattern Recognition Using Detector and Locator Neural Networks"; U.S. Pat. No. 5,214,717 which issued to Kimura et al. on May 25, 1993, entitled "Pattern Recognition Data Processing Device Using an Associative Matching Method"; and U.S. Pat. No. 5,181,258 which issued to Nagao and Terada on Jan. 19, 1993, entitled "Linear Pattern Recognizing Method".

Examples of pattern recognition systems involving learning processes, and components associated therewith, which my be utilized in accordance with the embodiments of the present invention, may be found in the following U.S. Patents: U.S. Pat. No. 5,218,529 which issued to Meyer et al. on Jun. 8, 1993, entitled "Neural Network System and Methods for Analysis of Organic Materials and Structures using Spectral Data"; U.S. Pat. No. 5,295,197 which issued to Takenaga et al. on Mar. 15, 1994, entitled "Information Processing System Using Neural Network Learning Functions"; U.S. Pat. No. 5,287,275 which issued to Kimura on Aug. 14, 1994, entitled "Image Recognition Apparatus and Method for Recognizing a Pattern within an Image"; U.S. Pat. No. 5,317,675 which issued to Ikehara on May 31, 1994, entitled "Neural Network Pattern Recognition Learning Method"; U.S. Pat. No. 5,245,696 which issued to Stork and Keesing on Nov. 21, 1993, entitled "Evolution and Learning in Neural Networks: The Number and Distribution of Learning Trials Affect the Rate of Evolution"; U.S. Pat. No. 5,214,715 which issued to Carpenter et al. on May 25, 1993, entitled "Predictive Self-organizing Neural Network"; and U.S. Pat. No. 5,222,194 which issued to Nishimura on Jun. 22, 1993, entitled "Neural Network with Modification of Neuron Weights and Reaction Coefficient".

Examples of impression cylinders, blanket cylinders, and components associated therewith, which my be utilized in accordance with the embodiments of the present invention, may be found in the following U.S. Patents: U.S. Pat. No. 5,469,787 which issued to Turner and Miller on Nov. 28, 1995, entitled "Multi-color Printing Press"; U.S. Pat. No. 5,477,780 which issued to Keller on Dec. 26, 1995, entitled "Horizontal Sheet Transfer Multiple Color Offset Rotary Printing Press with Horizontal Slide Access"; U.S. Pat. No. 5,167,187 which issued to Dettinger and Holl on Dec. 1, 1992, entitled. "Throw-on/Throw-off Device for a Blanket Cylinder in the Printing Unit of a Sheet-fed Offset Press"; U.S. Pat. No. 4,506,602 which issued to Sugiyama and Ishida on Mar. 26, 1985, entitled "Impression Cylinder Device of Sheet-fed Printing Press with Turn-over Mechanism"; U.S. Pat. No. 4,596,183 which issued to Steiner et al. on Jun. 24, 1986, entitled "Method of Measuring the Printing Pressure in a Printing Machine"; and U.S. Pat. No. 5,397,651 which issued to Wirz on Mar. 14, 1995, entitled "Foil for Covering an Impression Cylinder".

Examples of measuring devices, measuring systems, and components associated therewith, which my be utilized in accordance with the embodiments of the present invention, may be found in the following U.S. Patents: U.S. Pat. No. 5,390,908 which issued to Luxem on Feb. 21, 1995, entitled "Device and Method for Detecting and Gripping Sheets"; U.S. Pat. No. 5,162,865 which issued to Kipphan and Loffler on Nov. 10, 1992, entitled "Method and Device for Positioning a Sensor Device"; U.S. Pat. No. 5,126,578 which issued to Roch et al. on Jun. 30, 1992, entitled "Process and Device for Measuring Displacement Rates of a Web Running Through a Multi-color Rotary Printing Press"; U.S. Pat. No. 4,715,922 which issued to Hayashi and Kawamori on Dec. 29, 1987, entitled "Automatic Paper Roll Pasting Apparatus for Rotary Presses"; U.S. Pat. No. 4,552,066 which issued to Giori and Germann on Nov. 12, 1985, entitled "Combined Sheet Fed Rotary Printing Machine for Securities, in Particular Bank-notes"; and U.S. Pat. No. 4,596,183 which issued to Steiner et al. on Jun. 24, 1986, entitled "Method of Measuring the Printing Pressure in a Printing Machine".

Examples of scanning devices, sensors, and components thereof, which may be utilized in accordance with the embodiments of the present invention, may be found in the following U.S. Patents: U.S. Pat. No. 5,416,577 which issued to Haggerty et al. on May 16, 1995, entitled "Color Sensor for Optically Measuring Consisting and Brightness of Materials"; U.S. Pat. No. 5,418,638 which issued to Hirasawa on May 23, 1995, entitled "Apparatus for Detecting Light locus Position"; U.S. Pat. No. 5,426,288 which issued to Obata and Goto on Jun. 20, 1995, entitled "Bar Code Reader and Reading Method Using Single Laser Light Source for Both Reading Information and Measuring Distance"; U.S. Pat. No. 5,432,622 which issued to Johnston and Malm on Jul. 11, 1995, entitled "High-resolution Scanning Apparatus"; U.S. Pat. No. 5,452,090 which issued to Progler and Rosenbluth on Sep. 19, 1995, entitled "CCD Based Confocal Filtering for Improved Accuracy in X-Ray Proximity Alignment"; and U.S. Pat No. 5,454,048 which issued to Davis on Sep. 26, 1995, entitled "Apparatus for Multiplexed Imaging Using Optically-generated Kronecker Products".

Examples of remote control systems and components thereof, which may be utilized in accordance with the embodiments of the present invention, may be found in the following U.S. Patents: U. S. Pat. No. 5,398,606 which issued to Becker on Jul. 15, 1993, entitled "Device for Actuating Clamping Members of a Turning Device by Remote Control"; and U.S. Pat. No. 5,228,390 which issued to Jahn on Aug. 7, 1990, entitled "Rotary Printing Machine with Device for Engaging a Lacquering/Rubber-covered Cylinder with and Disengaging it from an Impression Cylinder and/or a Metering Plate Cylinder".

Examples of grippers, gripping systems, and components thereof, which may be utilized in accordance with the embodiments of the present invention, may be found in the following U.S. Patents: U.S. Pat. No. 5,413,040 which issued to Sugiyama and Kida on May 9, 1995, entitled "Sheet Reversing Apparatus for Sheet-fed Rotary Press with Reversing Mechanism"; U.S. Pat. No. 5,431,099 which issued to Maass and Kurzer on Jul. 11, 1995, entitled "Device for Measuring Contact Pressure of a Gripper Device in a Sheet-fed Rotary Printing Press"; U.S. Pat. No. 5,454,312 which issued to Helmstaedter and Spiegel on Oct. 3, 1995, entitled "Rotary Sheet-fed Printing Press for Recto and Verso Printing Having an Impression Cylinder Double the Diameter of a Blanket Cylinder and Serving as a Storage Drum"; U.S. Pat. No. 5,477,780 which issued to Keller on Dec. 26, 1995, entitled "Horizontal Sheet Transfer Multiple Color Offset Rotary Printing Press with Horizontal Slide Access"; and U.S. Pat. No. 5,419,254 which issued to DeMoore et al. on May 30, 1995, entitled "Vacuum Transfer Apparatus for Rotary Sheet-fed Printing Presses".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 195 14 252.7, filed on Apr. 15, 1995, having inventors Harald Bucher and Anton Rodi, and DE-OS 195 14 252.7 and DE-PS 195 14 252.7, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, sinus modifications and variations thereof may be made without departing from the spirit and scope of the invention.

PARTIAL LIST OF REFERENCE NUMERALS 1 sheet-transfer drum
2 sheet
3 sheet-transfer drum
4 sheet end
5 sheet-guiding plate
6 blowing box
7 distance
8 air-supplying system
9 space
10 outlet
11 air cushion
12 fastening screw
13 fastening screw
14 measuring system

What is claimed is:

1. Method of determining sheet alignment in an apparatus, the apparatus comprising means for holding a sheet with a design thereon during transfer of a sheet with a design thereon from one structure to another structure in the apparatus, said method comprising the steps of:

aligning a sheet with a design thereon at least partially onto a guiding surface with compressed air being blown through at least one orifice;

guiding a sheet with a design thereon with a plate for guiding a sheet;

directing a beam onto the sheet with the design thereon;

reflecting said beam off the sheet with the design thereon;

directing said reflected beam from the sheet with the design thereon onto detecting means, said detecting means comprising a position sensitive receiver for detecting said reflected beam;

generating a signal with said reflected beam received by said detecting means, which signal corresponds to a position of the design on the sheet; and disposing said detecting means at a location substantially adjacent one of said at least one orifice, said detecting means being disposed to detect the position of the design on the sheet from which said reflected beam is reflected.

2. The method of determining sheet alignment in an apparatus according to claim 1, including:

providing chamber means for supplying said compressed air to be blown through said at least one orifice, said chamber means comprising said at least one orifice; and disposing said chamber means substantially adjacent said guiding surface.

3. The method of determining sheet alignment in an apparatus according to claim 2, wherein:

said guiding surface has a direction of movement; and said method further comprises disposing said plate for guiding a sheet substantially adjacent said guiding surface.

4. The method of determining sheet alignment in an apparatus according to claim 3, including disposing a surface of said chamber means a plurality of distances from said guiding surface, said chamber means surface forming a gap between said chamber means surface and said guiding surface, said plurality of distances comprising a minimal gap and a maximal gap; and disposing said detecting means to determine the location of the design on a sheet upon the design being disposed substantially adjacent to the location of said minimal gap.

5. The method of determining sheet alignment in an apparatus according to claim 4, including:

affixing said chamber means and said plate for guiding to one another, said affixed said chamber means and said plate for guiding comprising a unit;

adjustably disposing said unit with respect to said guiding surface;

said guiding a sheet with a design thereon further comprises disposing a sheet with a design thereon to be movable in a direction of movement of said guiding surface, said direction of movement of said guiding surface comprising movement in a direction from upstream of said unit toward downstream of said unit, thereby moving a sheet with a design thereon from an upstream position to a downstream position, said unit having an upstream portion and a downstream portion, said upstream portion and said downstream portion being disposed substantially opposite one another; and disposing said chamber means of said unit downstream from said plate for guiding.

6. The method of determining sheet alignment in an apparatus according to claim 5, wherein said disposing said detecting means further comprises disposing said detecting means to detect adjacent to said minimal gap, said minimal gap being downstream from said maximal gap.

7. The method of determining sheet alignment in an apparatus according to claim 6, wherein:

said another structure comprises a drum having an axis of rotation;

said drum comprising an outer cylindrical surface;

said drum having a width dimension substantially parallel to the axis of rotation of said drum; and said outer cylindrical surface of said drum comprising said guiding surface.

8. The method of determining sheet alignment in an apparatus according to claim 7, wherein said method is being performed in a printing press.

9. A device for determining sheet alignment in an apparatus for feeding sheets, said device comprising:

means for holding a sheet with a design thereon during transfer of a sheet with a design thereon from one structure to another structure in the apparatus;

a plate for guiding a sheet with a design thereon;

a beam source for directing a beam onto a sheet with design thereon;

detecting means for detecting a beam reflected from a sheet with a design thereon, said detecting means comprising a position sensitive receiver for detecting a reflected beam;

at least one orifice;

a guiding surface;

chamber means for supplying compressed air to be blown through said at least one orifice to align a sheet with a design thereon at least partially onto said guiding surface;

said detecting means being disposed to detect a position of the design on a sheet from which sheet said reflected beam is reflected, upon the sheet being substantially adjacent said at least one orifice; and a signal generator for generating a signal from the reflected beam received by said detecting means, the generated signal corresponding to the position of the design on a sheet.

10. The device according to claim 9, wherein:

said guiding surface having a direction of movement;

said chamber means comprising said at least one orifice;

said chamber means being disposed substantially adjacent said guiding surface; and said plate for guiding being disposed substantially adjacent said guiding surface.

11. The device according to claim 10, wherein:

said chamber means comprises a surface, said surface of said chamber means being disposed a plurality of distances from said guiding surface;

said plurality of distances being a gap, said gap comprising a minimal gap and a maximal gap; and said detecting means being disposed to determine the location of the design on a sheet upon the design being disposed substantially adjacent said minimal gap.

12. The device according to claim 11, wherein:

said chamber means and said plate for guiding are affixed to one another, said affixed said chamber means and said plate for guiding comprising a unit;

said unit being adjustably disposed with respect to said guiding surface;

means for moving a sheet with a design thereon, adjacent said unit, from an upstream position to a downstream position;

said direction of movement of said guiding surface comprising movement in a direction from upstream of said unit toward downstream of said unit;

said unit comprising an upstream portion and a downstream portion, said upstream portion and said downstream portion being disposed substantially opposite one another; and said chamber means of said unit being disposed downstream from said upstream portion of said plate for guiding.

13. The device according to claim 12, wherein said detecting means is disposed to detect the design on e sheet upon the design on a sheet being adjacent to said minimal gap, said minimal gap being in a downstream position with respect to said maximal gap.

14. The device according to claim 13, wherein:

said apparatus is a printing press;

said another structure comprises a drum of said printing press, said drum having an axis of rotation;

said drum having a width dimension substantially parallel to the axis of rotation of said drum;

said drum comprising an outer cylindrical surface; and said guiding surface is disposed on said outer cylindrical surface of said drum.

15. The device according to claim 14, wherein said upstream portion of said unit is disposed substantially adjacent said one structure.

16. A method of operating a device for determining sheet alignment in an apparatus for feeding sheets, the apparatus comprising means for holding a sheet with a design thereon during transfer of a sheet with a design thereon from one structure to another structure in the apparatus, said device comprising: a plate for guiding a sheet with a design thereon, a beam source for directing a beam onto a sheet with a design thereon, detecting means for detecting a beam reflected from a sheet with a design thereon, said detecting means comprising a position sensitive receiver for detecting a reflected beam, at least one orifice, a guiding surface, chamber means for supplying compressed air to be blown through said at least one orifice to align a sheet with a design thereon at least partially onto said guiding surface, said detecting means being disposed to detect a position of the design on a sheet from which sheet said reflected beam is reflected, upon the sheet being substantially adjacent said at least one orifice; and a signal generator for generating a signal from the reflected beam received by said detecting means, the generated signal corresponding to the position of the design on a sheet;

said method comprising the steps of:

aligning a sheet with a design thereon at least partially onto a guiding surface with compressed air being blown through at least one orifice;

guiding a sheet with a design thereon with a plate for guiding a sheet;

directing a beam onto the sheet with the design thereon; reflecting said beam off the sheet with the design thereon;

directing said reflected beam from the sheet with the design thereon onto detecting means, said detecting means comprising a position sensitive receiver for detecting said reflected beam;

generating a signal with said reflected beam received by said detecting means, which signal corresponds to a position of the design on the sheet; and disposing said detecting means at a location substantially adjacent one of said at least one orifice, said detecting means being disposed to detect the position of the design on the sheet from which said reflected beam is reflected.

17. The method according to claim 16, wherein:

said apparatus is a printing press; and said method further comprises:

providing chamber means for supplying said compressed air to be blown through said at least one orifice, said chamber means comprising said at least one orifice;

disposing said chamber means substantially adjacent said guiding surface;

disposing said guiding surface to have a direction of movement; and disposing said plate for guiding a sheet substantially adjacent said guiding surface.

18. The method according to claim 17, including:

disposing a surface of said chamber means a plurality of distances from said guiding surface, said chamber means surface forming a gap between said chamber means surface and said guiding surface, said plurality of distances comprising a minimal gap and a maximal gap; end disposing said detecting means to determine the location of the design on a sheet upon the design being disposed substantially adjacent to the location of said minimal gap.

19. The method according to claim 18, including affixing said chamber means and said plate for guiding to one another, said affixed said chamber means and said plate for guiding comprising a unit;

adjustably disposing said unit with respect to said guiding surface;

said guiding a sheet with a design thereon further comprises disposing a sheet with a design thereon to be movable in a direction of movement of said guiding surface, said direction of movement of said guiding surface comprising movement in a direction from upstream of said unit toward downstream of said unit, thereby moving a sheet with a design thereon from an upstream position to a downstream position, said unit having an upstream portion and a downstream portion, said upstream portion and said downstream portion being disposed substantially opposite one another; and disposing said chamber means of said unit downstream from said plate for guiding.

20. The method according to claim 19, wherein:

the step of disposing said detecting means further comprises disposing said detecting means to detect the design on a sheet upon the design on a sheet being adjacent to said minimal gap, said minimal gap being downstream from said maximal gap;

said another structure comprises a drum having an axis of rotation;

said drum comprising an outer cylindrical surface;

said drum having a width dimension substantially parallel to the axis of rotation of said drum;

said outer cylindrical surface of said drum comprising said guiding surface; and said method further comprises disposing said upstream portion of said unit substantially adjacent said one structure.

* * * * *

UNITED STATES PATENT AND TRADEMARK OFFICE

CERTIFICATE OF CORRECTION

PATENT NO. : 5,659,178

DATED : August 19, 1997

INVENTOR(S) : Harald BUCHER and Anton RODI

It is certified that error appears in the above-identified patent and that said Letters Patent is hereby corrected as shown below:

In column 1, line 47, after 'air,', delete "end" and insert --and--.

In column 7, line 58, before 'other', delete "end" and insert --and--.

In column 9, line 13, before 'be', delete "my" and insert --may--.

In column 9, line 36, after 'which', delete "my" and insert --may--.

In column 9, line 56, after 'which', delete "my" and insert --may--.

UNITED STATES PATENT AND TRADEMARK OFFICE

CERTIFICATE OF CORRECTION

PATENT NO. : 5,659,178

DATED : August 19, 1997

INVENTOR(S) : Harald BUCHER and Anton RODI

It is certified that error appears in the above-identified patent and that said Letters Patent is hereby corrected as shown below:

In column 11, line 28, after 'thereof,', delete "sinus" and insert --since--.

In column 13, line 8, Claim 9, before 'design' insert --a--.

In column 13, line 67, Claim 13, after 'on', delete "e" and insert --a--.

In column 15, line 11, Claim 18, after 'gap;', delete "end" and insert --and--.

Signed and Sealed this

Twenty-third Day of June, 1998

Attest:

BRUCE LEHMAN

*Attesting Officer*

*Commissioner of Patents and Trademarks*